Sept. 13, 1932.  J. G. HODGE  1,877,461
PISTON RING STRUCTURE
Filed May 15, 1930
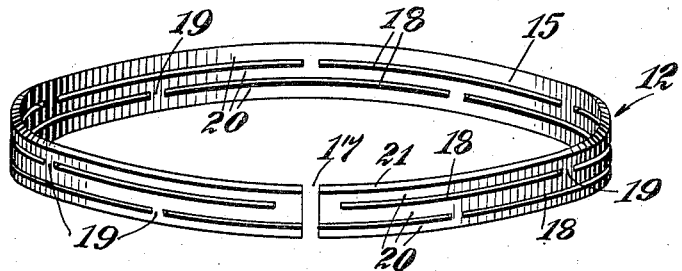
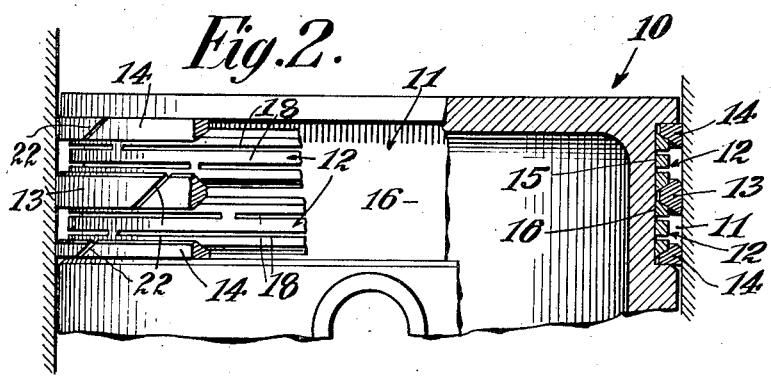
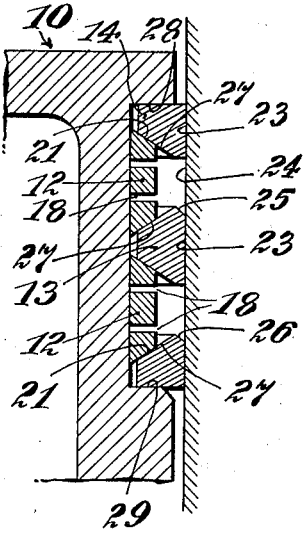
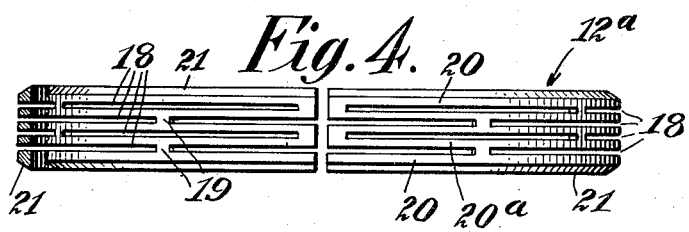
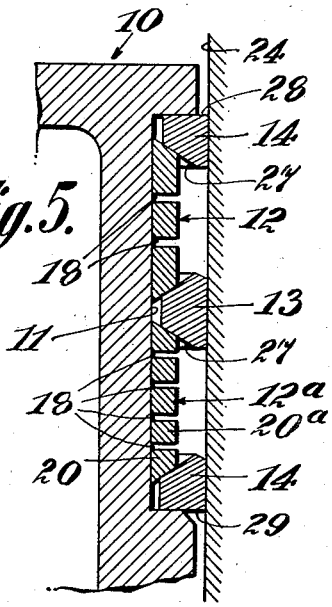
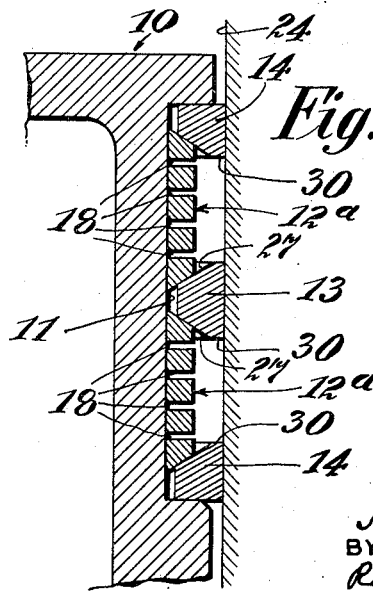
INVENTOR
James G. Hodge
BY
Ramsey and Kent
ATTORNEYS Patented Sept. 13, 1932

1,877,461

UNITED STATES PATENT OFFICE

JAMES G. HODGE, OF EAST ORANGE, NEW JERSEY

PISTON RING STRUCTURE

Application filed May 15, 1930. Serial No. 452,539.

My invention relates to new and improved piston ring structures, or arrangements of rings, for pistons of internal combustion or other engines, pumps, etc. The nature and advantages of the invention will be sufficiently understood from present description of it as incorporated in a trunk piston for an internal combustion engine.

The principal feature of the invention is one or more rings which are expansible in the axial direction of the piston in combination with outer rings which perform the gas sealing function and are urged radially expansibly by the inner or axially expanding rings. The inner rings have a circular strip and slot formation to provide axial compressibility and expansion, and the inner and outer rings have cooperating conical surfaces so that the axial expansive force of the inner rings is converted into a radial force to expand the outer rings and maintain them in firm resilient contact with the cylinder wall.

The characteristics and advantages of the invention are further sufficiently explained in connection with the following detail description of the accompanying drawing, which show representative embodiments. After considering these examples, skilled persons will understand that many variations may be made without departing from the principles disclosed and I contemplate the employment of any structures that are properly within the scope of the appended claims.

Fig. 1 is a perspective view of an inner or axially expansible ring constituting one of the principal features of the invention.

Fig. 2 is a view partly in side elevation and partly in section of the upper portion of a piston with inner and outer rings therein and embodying the complete invention in one form.

Fig. 3 is an enlarged partial section of the same in an axial plane.

Fig. 4 is a view, partly in side elevation and partly in axial section of a somewhat modified inner ring.

Fig. 5 is a view similar to Fig. 3 of a modified structure or arrangement.

Fig. 6 is a similar view of another modification.

Fig. 2 shows the upper portion of a typical trunk piston 10 having in its side wall at any proper location a wide groove 11 to receive the rings. The drawing shows only one groove with its proper complement of rings, but of course, if necessary or desirable, there may be two or more grooves and sets of rings all embodying the invention; or the present invention structure or arrangement may be employed in a piston having also additional oil grooves, or grooves and rings of any known or suitable type.

In each groove such as 11, are located one or more—as shown, two inner rings 12, and two or more—as shown, three outer rings 13 and 14, of which the upper and lower rings 14 differ somewhat from the intermediate ring 13, as will appear.

The inner rings in the form shown in Figs. 1, 2 and 3, have flat cylindrical inner faces 15 to confront or engage the cylindrical surface 16 of the piston groove, and are split at one point 17 to allow for radial expansion and insertion in the groove. The inner rings may be so dimensioned and formed that they will have a radially contractile action and engagement with the cylindrical groove surface, or may have moderate radially expansive tendency when located in the groove and in such case will be forced to engage the cylindrical groove surface by their axial expansive action in cooperation with the outer rings, as will appear. For the desired axial compression and expansion of the inner rings, each of them is formed with circularly extending segmental or interrupted slots 18, the circular continuity of the respective upper and lower slots being interrupted by axially extending integral walls or bridge pieces 19 which are short in the circular direction. The entire ring is thus practically divided into resiliently spaced strips 20 so that the ring as a whole when in normal or free form, as in Fig. 1, is resiliently compressible widthwise or in the axial direction of the piston by deflection of the various annular strips or sub-ring portions 20 between the connecting bridge pieces or struts 19 which, as clearly shown, are, with respect to the different slots, in staggered or interspaced relation thus providing for the bowing or flexure of each strip between each two struts and of the next strip between its respective slots and so on, so that the entire ring structure is resiliently compressible in the axial direction. The upper and lower edges of the ring as a whole, that is, the upper edge of the upper strip formation 20 and the lower edge of the lower strip, are beveled as at 21, or as otherwise stated these ring surfaces are conical, the angle or pitch of the cone being suitable for the intended purpose of expanding the outer rings, and this angle may be varied in accordance with the expansive pressure desired and in relation to other factors of design.

The upper and lower outer rings 14 may be of identical form—the lower ring being the same as the upper one, (inverted) and the intermediate ring 13 is of somewhat different form, as will appear. All of these rings, except for features peculiar to the invention, may be of the concentric split type, the splits (or adjacent free ends) 22 being preferably diagonally arranged as usual. All of them have flat or plain cylindrical outer faces 23 to engage the cylinder wall 24. Some or all of the outside corners of the rings may be beveled or conical, although this is not essential in all cases. As shown the upper and lower outer corners or corner edges 25 of the center ring are conically beveled and the lower corner 26 of the upper ring and upper corner 26 of the lower ring are similarly beveled. The main lower side surface 27 of the upper ring and the similar upwardly directed surface of the lower ring are beveled or conical, at the same cone angle as the engaging surfaces 21 of the inner rings, while the similar upper and lower faces 27 of the intermediate ring are similarly beveled or coned to cooperate with the coned faces of the two inner rings. The upper and lower, or outward, faces 28 of the upper and lower rings respectively may be flat annular faces, as usual, to cooperate with the flat annular upper and lower faces 29 of the piston groove.

The rings are placed in the piston groove in the position shown in Figs. 2 and 3, that is, with each inner ring operatively intermediate the central outer ring 13 and the upper and lower outer ring 14, respectively. The entire group of rings is so designed or dimensioned that when placed in the piston groove and the piston is located in the center, as in Figs. 2 and 3, the outer rings are contracted to normal circumferential dimensions and this contraction of the outer rings by the reaction of their beveled faces 27 on the beveled or conical faces 21 of the inner rings, compresses the inner rings in the axial direction; or, as conversely stated, in operation the axial resilient expansion force of the inner rings and the reaction of the respective conical ring faces causes the outer rings to be expanded with the proper force and resiliently maintains the proper contact of the outer cylindrical ring faces with the cylinder wall, insuring an exceptionally gastight fit, proper oil wiping of the cylinder wall, and at the same time the beveled corner faces 25, 26 of the outer rings tend to prevent undue wiping of oil from the wall surface and on the contrary tend to retain on the engaging ring and cylinder surfaces the desired lubricating film. The powerful axial expansion force of the inner rings, regulable in amount by the design or dimensions of the complete ring structure, provides for maintenance of the desired running fit of the outer rings through long service without regard to the inherent radial expansive or contractile action of the outer rings. Therefore, the material and design factors of the outer rings may be chosen mainly with respect to wearing qualities without regard or with less regard to resilient function, while the inner rings have no engagement with the cylinder wall and no appreciable wear and may be of material and design appropriate to their principal function, that is, to actively expand the outer rings by resilient axial expansive force exerted by the inner rings.

Since the outer rings are not confined radially until the piston is placed in the cylinder the various rings may in some cases be separately inserted in the piston groove in the proper order; otherwise the entire group of rings in proper arrangement may be placed in a suitable manipulating tool or clamp and placed in the groove by proper manipulation of such holding implement and/or after the rings are placed in the groove and when the piston is to be inserted in the cylinder, the outer rings may be forced or held inward by a suitable sleeve or other implement, as will be understood by skilled persons without further explanation.

Fig. 4 shows a modified inner ring 12a which has a greater number, namely, four of the interrupted annular slots 18 providing five annular ring strips 20 and 20a instead of three such strips, as in Fig. 1, and also showing that the intermediate strips such as 20a may, if desired, be narrower than the outer strips 20. Otherwise this ring structure may be similar to that of Fig. 1 but has an amplified resilient axial expansive action due to the greater number of slot and ring strip formations.

Fig. 5 shows that one of the inner rings, such as the upper ring, may be of a different type or design from the other, such as the lower ring, thus, in this case the upper ring 12 is identical or similar to the inner ring 12 of Fig. 1 having two sets of interrupted slots and three resiliently connected strips, while the lower ring 12a is of the type of Fig. 4, as above sufficiently described.

Fig. 6 shows another modified arrangement in which both the upper and lower inner rings 12a are of the type of Fig. 4; and evidently in view of the preceding explanation, the number of ring slots and strips and other features of design or arrangement may be varied greatly.

Fig. 6 also shows the upper and lower outer side faces 30 of the outer rings straight (or in flat annular form instead of beveled as at 25 and 26) Fig. 3, which is desirable in some cases to give increased oil wiping and gas sealing effect.

I claim:—

1. A piston and ring structure comprising in combination with a piston having a ring groove, an inner and outer ring in the groove, the inner ring having a cylindrical inner face engaging the piston, the outer ring having cylinder wall engagement, the inner ring being split and axially expansive and the inner and outer ring having cooperating means by which axial expansion of the inner ring produces radial expansion of the outer ring.

2. A piston and ring structure comprising in combination with a piston having a ring groove, an inner and an outer ring in the groove, the inner ring having a cylindrical inner face engaging the piston, the outer ring having cylinder wall engagement, the inner ring being split and axially expansive and the inner and outer rings having cooperating conical faces acting by axial expansion of the inner ring to produce radial expansion of the outer ring and resilient contact with the cylinder wall.

3. A piston and ring structure comprising in combination with a piston having a ring groove, an inner and an outer ring in the groove, the inner ring having a cylindrical inner face engaging the piston, the outer ring having cylinder wall engagement, the inner ring comprising a plurality of integral spaced annular strips connected for flexure and resilient expansion and contraction in the axial direction, and the inner and outer rings having cooperating means by which axial expansion of the inner ring produces radial expansion of the outer ring.

4. A piston and ring structure comprising in combination with a piston having a ring groove, an inner and an outer ring in the groove, the inner ring having a cylindrical inner face engaging the piston, the outer ring having cylinder wall engagement, the inner ring comprising a plurality of integral spaced annular strips connected for flexure and resilient expansion and contraction in the axial direction, and the inner and outer ring having cooperating conical faces acting by axial expansion of the inner ring to produce radial expansion of the outer ring and resilient contact with the cylinder wall.

5. A piston ring and structure comprising in combination with a piston having a ring groove, a plurality of outer rings and a plurality of inner rings in the groove, the inner rings being in interspaced relation to the outer rings, the inner rings being split and axially expansible and contractile and the inner and outer ring having cooperating means by which axial expansion of the inner rings produces radial expansion of the outer rings.

6. A piston ring and structure comprising in combination with a piston having a ring groove, a plurality of outer rings and a plurality of inner rings in the groove, the inner rings being split and in interspaced relation to the outer rings, the inner rings being axially expansible and contractile and the inner and outer rings having cooperating conical faces by which axial expansion of the inner rings produces radial expansion of the outer rings.

JAS. G. HODGE.